United States Patent
Cooke et al.

(10) Patent No.: US 7,787,737 B2
(45) Date of Patent: Aug. 31, 2010

(54) FIBER OPTIC DUST CAP ASSEMBLY AND METHOD

(75) Inventors: Terry Lee Cooke, Hickory, NC (US); David Lee Dean, Jr., Hickory, NC (US); Tory Allen Klavuhn, Newton, NC (US); Clyde Benton Mabry, III, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/348,435

(22) Filed: Jan. 5, 2009

(65) Prior Publication Data

US 2010/0129043 A1    May 27, 2010

Related U.S. Application Data

(60) Provisional application No. 61/117,394, filed on Nov. 24, 2008.

(51) Int. Cl.
*G02B 6/00* (2006.01)

(52) U.S. Cl. ....................................... 385/134
(58) Field of Classification Search ................ None
See application file for complete search history.

(56) References Cited

U.S. PATENT DOCUMENTS

| | | | | |
|---|---|---|---|---|
| 5,202,949 A | * | 4/1993 | Hileman et al. | 385/134 |
| 5,967,189 A | * | 10/1999 | Cheng | 138/89 |
| 6,227,717 B1 | * | 5/2001 | Ott et al. | 385/53 |
| 6,516,129 B2 | * | 2/2003 | Chan et al. | 385/134 |
| 6,736,548 B2 | * | 5/2004 | Tanaka et al. | 358/78 |

* cited by examiner

*Primary Examiner*—Sung H Pak (57) ABSTRACT

A fiber optic dust cap assembly for protecting fiber optic components is provided. The protected fiber optic components may include fiber optic adapters and fiber optic connectors. The fiber optic dust cap assembly includes a plurality of dust caps each coupled to a lanyard. Each of the plurality of dust caps is configured for insertion into a fiber optic component. The lanyard is configured to facilitate management of the dust caps. The lanyard is also configured to facilitate removal of the dust caps from the fiber optic components. Each of the dust caps among the plurality of dust caps may be removed by pulling on the lanyard. The lanyard may also facilitate removal of each of the plurality of dust caps in one pulling action. Additionally, by the plurality of dust caps being connected to the lanyard, the plurality of dust caps coupled to the lanyard remain together after removal.

23 Claims, 13 Drawing Sheets

FIBER OPTIC DUST CAP ASSEMBLY AND METHOD

CROSS-REFERENCE TO RELATED APPLICATIONS

This application claims the benefit of priority under 35 U.S.C. §119(e) of U.S. Provisional Application Ser. No. 61/117,394 filed on Nov. 24, 2008.

FIELD OF THE DISCLOSURE

The technology of the disclosure relates to a dust cap for fiber optic components, including fiber optic adapters and connectors.

TECHNICAL BACKGROUND

Benefits of optical fiber include extremely wide bandwidth and low noise operation. Because of these benefits, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points at which it is necessary to link optical fibers in order to provide "live fiber" from one connection point to another connection point. In this regard, fiber optic equipment is located in data distribution centers or central offices to support interconnections. The fiber optic equipment is customized based on the application need. The fiber optic equipment is typically included in housings that are mounted in equipment racks to maximize space.

One example of fiber optic equipment provided at data distribution centers or central offices is a fiber optic adapter module. A fiber optic adapter module is designed to provide optical fiber connectors between optical fibers in connectorized fiber optic cables and to manage the polarity of the fiber optic connections. In order to provide fiber optic connections, the fiber optic adapter module includes a number of fiber optic adapters which facilitate the connection of fiber optic connectors to fiber optic adapters. As an example, a fiber optic adapter module may have forty-eight (48) LC duplex fiber optic adapters to support ninety-six (96) optical fiber connections to eight (8) MTP fiber optic adapters. Each MTP fiber optic adapter supports twelve (12) optical fiber connections. An optical connection is established by connecting an LC connectorized duplex fiber optic cable into an LC fiber optic adapter on one side of the fiber optic adapter module and connecting an MTP connectorized fiber optic cable into an MTP fiber optic adapter on a second side of the fiber optic adapter module.

To prevent or reduce particulate from contaminating the fiber optic adapters, dust caps are typically placed inside the fiber optic adapters when not connected. Thus, for the aforementioned example of a fiber optic adapter module, up to one hundred four (104) dust caps may be employed if no optical connections are made. This consists of ninety-six (96) LC fiber optic adapter dust caps plus eight (8) MTP fiber optic adapter dust caps. In a similar regard, dust caps may be placed over end faces of fiber optic connectors to protect a ferrule and the polished core of an optical fiber from being scratched, chipped, or damaged.

When a technician establishes fiber optic connections in a fiber optic adapter module, the technician must remove the dust caps. Dust caps may need to be removed from both the fiber optic adapters in a fiber optic adapter module and fiber optic connectors on fiber optic cables to be connected to the fiber optic adapters. Depending on the number of fiber optic adapter modules provided at a facility, a large number of dust caps may need to be removed to establish the desired fiber optic connections. Removing dust caps takes considerable technician time and cost. The small size of dust caps also makes it difficult for a technician to grip the end of the dust cap during removal. The difficulty in removing the dust caps may also increase technician time. Also, as a technician removes the dust caps, due to the small size of the dust caps, the technician may be inclined to misplace or simply drop the dust caps in the equipment rack or on the floor, such that over time, a myriad of dust caps may accumulate.

Accordingly, a need exists for organizing dust caps, which promotes the reuse of dust caps and enhances the ease of removing dust caps from fiber optic components, including fiber optic adapters and connectors. Organization of the dust cap in turn may facilitate or enhance organization of fiber optic connectors.

SUMMARY

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

Embodiments disclosed in the detailed description include a fiber optic dust cap assembly for protecting fiber optic components. The protected fiber optic components may include, but are not limited to fiber optic adapters and fiber optic connectors. The fiber optic dust cap assembly includes a plurality of dust caps each coupled to a lanyard. Each of the plurality of dust caps is configured for insertion into a fiber optic component. The lanyard is configured to facilitate management of the dust caps. This includes facilitating removal of the dust caps from fiber optic components. Each of the dust caps among the plurality of dust caps may be removed by pulling on the lanyard. The lanyard may facilitate removal of each of the plurality of dust caps in one pulling action. Also, by the plurality of dust caps being connected to the lanyard, the plurality of dust caps remain coupled to the lanyard after removal.

In some embodiments disclosed herein, the lanyard may include one or more grips to facilitate handling of the fiber optic dust cap assembly. The plurality of dust caps may be removed from fiber optic components by pulling on the grip. The lanyard may couple directly to each of the plurality of dust caps, or one or more attachment cords may be disposed between each dust cap and the lanyard. Attachment cords facilitate the lanyard being located a distance away from the dust caps for convenient access. The lengths of the attachment cords may also be varied such that the lanyard is provided in a single longitudinal plane even if the fiber optic components that receive the plurality of dust caps are located in a plurality of different longitudinal planes.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

DETAILED DESCRIPTION

Reference will now be made in detail to the preferred embodiments of the invention, examples of which are illustrated in the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include a fiber optic dust cap assembly for protecting fiber optic components. The protected fiber optic components may include, but are not limited to fiber optic adapters and fiber optic connectors. The fiber optic dust cap assembly includes a plurality of dust caps each coupled to a lanyard. Each of the plurality of dust caps is configured for insertion into a fiber optic component. The lanyard is configured to facilitate management of the dust caps. This includes facilitating removal of the dust caps from fiber optic components. Each of the dust caps among the plurality of dust caps may be removed by pulling on the lanyard. The lanyard may facilitate removal of each of the plurality of dust caps in one pulling action. Also, by the plurality of dust caps being connected to the lanyard, the plurality of dust caps remain coupled to the lanyard after removal.

Figure 1:
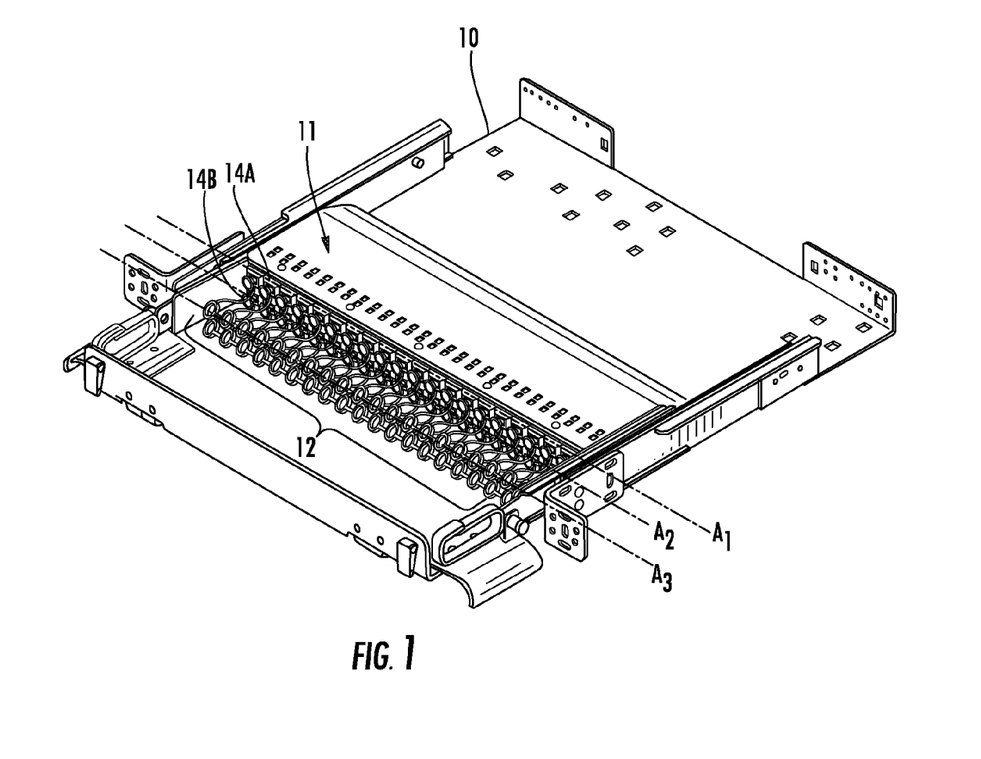
FIG. 1 illustrates a front, top perspective view of an exemplary fiber optic equipment tray supporting a fiber optic adapter module with a fiber optic dust cap assembly connected to a plurality of fiber optic adapters, according to one embodiment.

FIG. 1 illustrates a front, top perspective view of an exemplary fiber optic equipment tray which facilitates the interconnection of assemblies which are deployable in a network, such as a local area network (LAN) or storage area network (SAN) as examples. The fiber optic equipment tray 10 transitions MTP connectivity from MTP terminated trunks to single-fiber connectors for patching into electronics. Specifically, the fiber optic equipment tray 10 supports an adapter module 11. The adapter module 11 contains two rows of fiber optic adapters 14A and 14B each located along longitudinal axes $A_1$ and $A_2$, respectively, thereby forming a plurality of fiber optic adapters 14. The fiber optic adapters 14 support connections to pre-connectorized fiber optic cables. The connector types supported may be any type, including but not limited to LC, SC, ST, MTP, etc.

A fiber optic dust cap assembly 12 is inserted into one row of the fiber optic adapters 14A. Thus, the fiber optic dust cap assembly 12 is disposed along a longitudinal axis $A_3$. The fiber optic dust cap assembly 12 is inserted into the fiber optic adapters 14 such that the fiber optic dust cap assembly 12 protects the fiber optic adapters 14 from any particulates, such as dust or the like, which may enter the fiber optic adapters 14. The fiber optic adapters 14 may be any type of adapter which allows connections to optical fibers. In this example of the adapter module 11, the fiber optic dust cap assembly 12 is configured to protect LC adapters. As will be discussed in greater detail in FIG. 2, the fiber optic dust cap assembly 12 is configured such that a technician working with the adapter module 11 and the fiber optic adapters 14 may easily remove the fiber optic dust cap assembly 12 from the fiber optic adapters 14.

Figure 2:
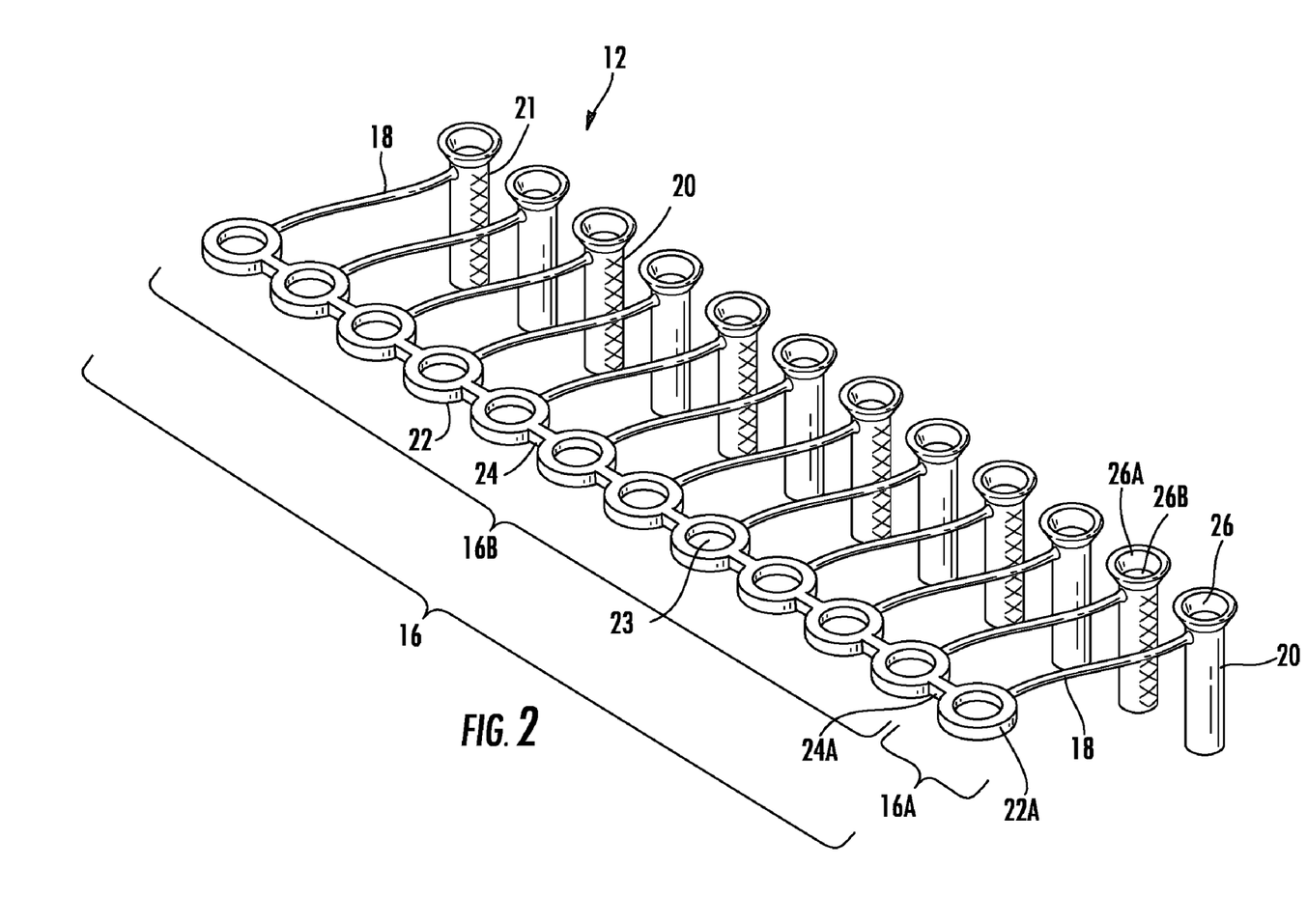
FIG. 2 illustrates a top perspective view of the fiber optic dust cap assembly in FIG. 1 providing attachment cords between a plurality of dust caps and a lanyard, according to one embodiment.

Now making reference to FIG. 2, a perspective view of the fiber optic dust cap assembly 12 in FIG. 1 is illustrated. The fiber optic dust cap assembly 12 includes a lanyard 16, attachment cords 18 coupled to the lanyard 16, and a plurality of dust caps 20 also coupled to the lanyard 16 via the attachment cords 18, where the lanyard 16 is coupled to each of the plurality of dust caps 20. The lanyard 16 provides a single point at which a technician may grip the fiber optic dust cap assembly 12 and remove the dust caps 20 from the fiber optic adapters 14. The attachment cords 18 extend the lanyard 16 from a surface of the fiber optic adapters 14, which allows for easier pulling of the lanyard 16, to facilitate removal of the dust caps 20 from the fiber optic adapter 14. The attachment cords 18 may be formed with any pliable material which allows for easy flexing of the attachment cords 18, such as a synthetic or semi-synthetic organic solid material, or the like. It should also be noted that when the fiber optic dust cap assembly 12 is manufactured using a molding process, the attachment cords 18 may be runners or sprues that are used to manufacture the fiber optic dust cap assembly 12, where the runners are used to feed material into the mold used to manufacture the lanyard 16 and the dust caps 20.

The lanyard 16 is configured such that a technician working with the fiber optic equipment tray 10 may easily remove the fiber optic dust cap assembly 12 from the fiber optic adapters 14. For example, the lanyard 16 may include a plurality of grips 22 coupled thereto where the grips 22 are spaced apart by one or more separation points 24. The grips 22 are configured to facilitate removal of the fiber optic dust cap assembly 12 from the fiber optic adapters 14. A technician may remove the dust caps 20 from adapters or other fiber optic components by pulling on one of the grips 22. For example, the grips 22 may have a circular configuration defining orifices 23 to allow a technician to place his/her finger, or any other object, within the grips 22 for pulling on the lanyard 16, thereby removing the fiber optic dust cap assembly 12 from the fiber optic adapters 14. As will be discussed further on, the lanyard 16 may have a number of configurations and may include grips having any configuration which allows for easy removal of the fiber optic dust cap assembly 12 from the fiber optic adapters 14, such as the shape of a polygon, a ribbed configuration, or the like.

The lanyard 16 may also include the one or more separation points 24 disposed between the grips 22. The separation points 24 enhance the ability to selectively remove dust caps from a fiber optic adapter. For example, in embodiments where a technician only needs to remove a single dust cap 20 from a single fiber optic adapter 14, the technician may separate the grips 22 from each other at a separation point 24A, thereby forming two separate lanyards 16A and 16B, where a first lanyard is defined by a first grip 22A on the lanyard 16A and the second lanyard is defined by a second grip, such as one of the remaining grips 22 on the lanyard 16B. When a technician separates the grips 22 from each other at one of the separation points 24, a single dust cap 20 of the fiber optic dust cap assembly 12 may be removed from a single fiber optic adapter 14. Thus, the remaining dust caps 20 will protect the remaining fiber optic adapters 14 which are not being used, from particulate contamination. Note that any number of separation points 24 may be provided to allow separation of one or more dust caps 20 to form two or more lanyards 16.

In addition to protecting the fiber optic adapters 14 from particulate contamination, each dust cap 20 allows a technician to monitor the presence of an optical signal in a fiber optic adapter 14. In particular, each dust cap 20 includes a viewing surface 26, which facilitates viewing of a fiber optic signal within the fiber optic adapters 14. Here, the viewing surface 26 includes a beveled portion 26A and a viewing portion 26B. As may be seen with reference to FIG. 3, which is a bottom view of the fiber optic dust cap assembly 12, the viewing portion 26B extends through the dust cap 20 such that a technician working with the fiber optic adapters 14 may view an optical signal through the viewing portion 26B prior to installing an optical fiber.

Each dust cap 20 may have any configuration which allows for easy insertion into a fiber optic component, including but not limited to fiber optic adapters. While the dust caps 20 are shown having a cylindrical configuration, each dust cap 20 may have any type of configuration, such as a polygon or the like. Furthermore, as may be seen in FIG. 2, one of the dust caps 20 may include some type of marking 21 to indicate proper configuration or orientation for insertion into the proper fiber optic components. For example, as illustrated in FIG. 2, the marking 21 is indicated by cross-hatching. However, this marking 21 may include any type of visual symbol or marking and may include shading or color-coding.

Figure 3:
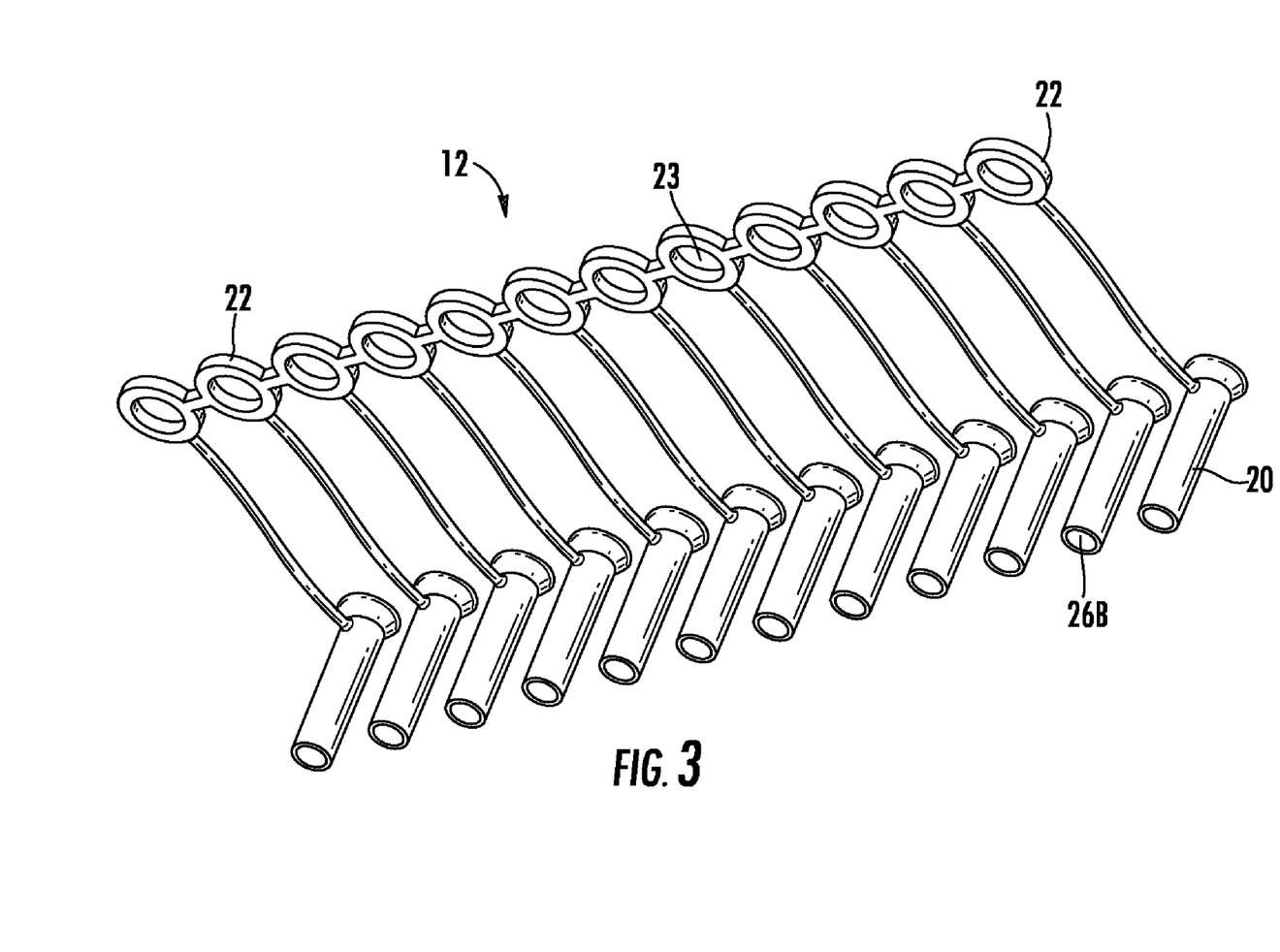
FIG. 3 illustrates a bottom perspective view of the fiber optic dust cap assembly in FIG. 2.

In addition to the embodiment shown in FIGS. 2 and 3, a fiber optic dust cap assembly may not include the attachment cords 18 as shown in FIGS. 2 and 3, in order to minimize costs and time associated with fabricating a fiber optic dust cap assembly. Now making reference to FIG. 4, an alternate embodiment of a fiber optic dust cap assembly which does not include attachment cords is shown. Here, a fiber optic dust cap assembly 28 includes the lanyard 16 and the dust caps 20. The fiber optic dust cap assembly 28 also includes the grips 22. However, the fiber optic dust cap assembly 28 does not include the attachment cords 18. Thus, the lanyard 16 directly couples to the dust caps 20. In this embodiment, a technician working with an adapter module and a fiber optic adapter may still remove the fiber optic dust cap assembly 28 from the fiber optic adapters 14 using the lanyard 16.

Figure 4:
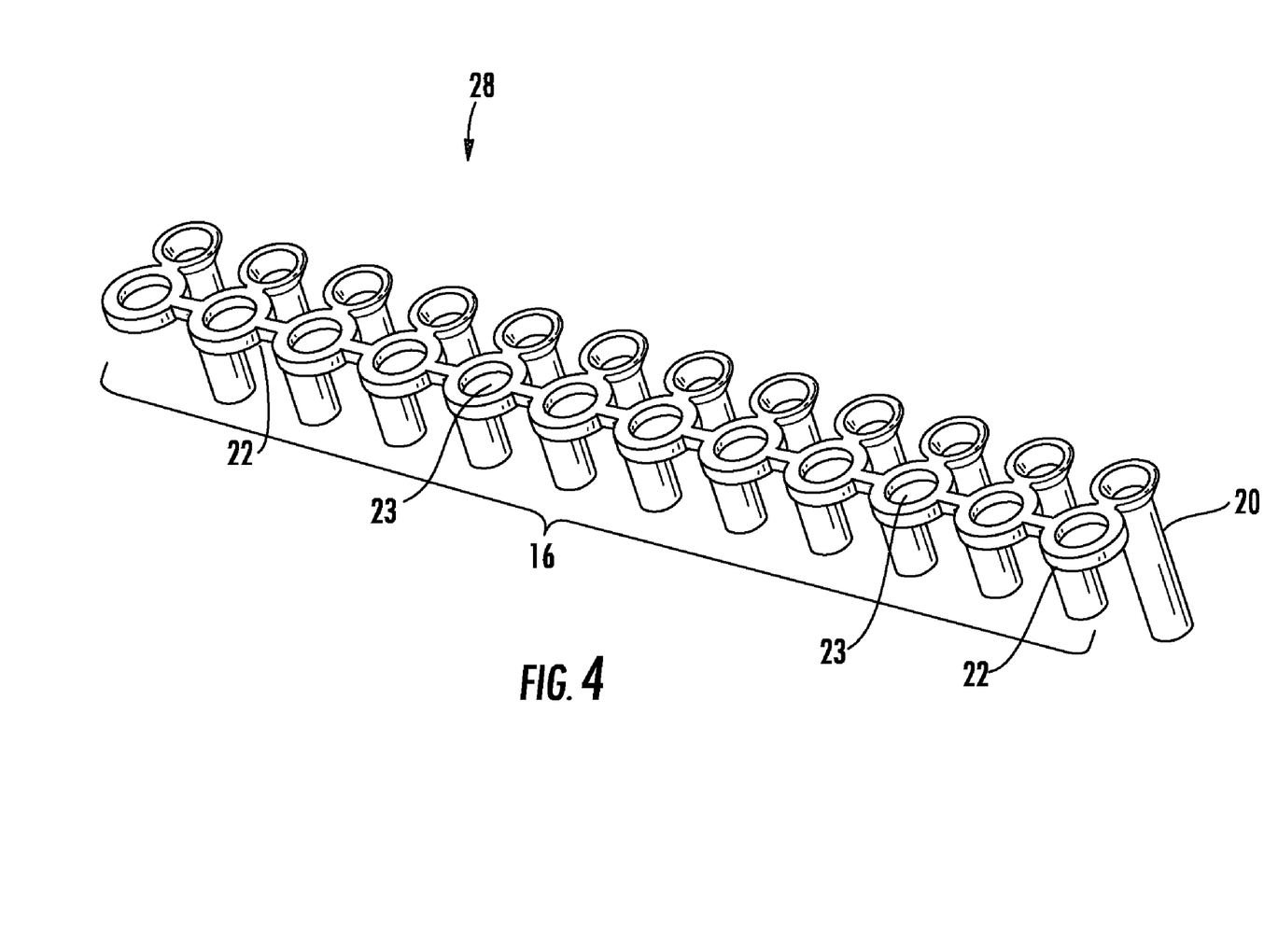
FIG. 4 shows an alternate exemplary embodiment of a fiber optic dust cap assembly wherein a lanyard is directly coupled to a plurality of dust caps.

In the embodiments shown in FIGS. 2-4, the fiber optic dust cap assemblies 12 and 28 include the grips 22 having a circular configuration. However, the fiber optic dust cap assemblies 12 and 28 in accordance with alternate embodiments, may have grips having different configurations, which provide a technician with a surface that is easy to grab and pull, such as a rod configuration, as more clearly shown in FIG. 5.

Figure 5:
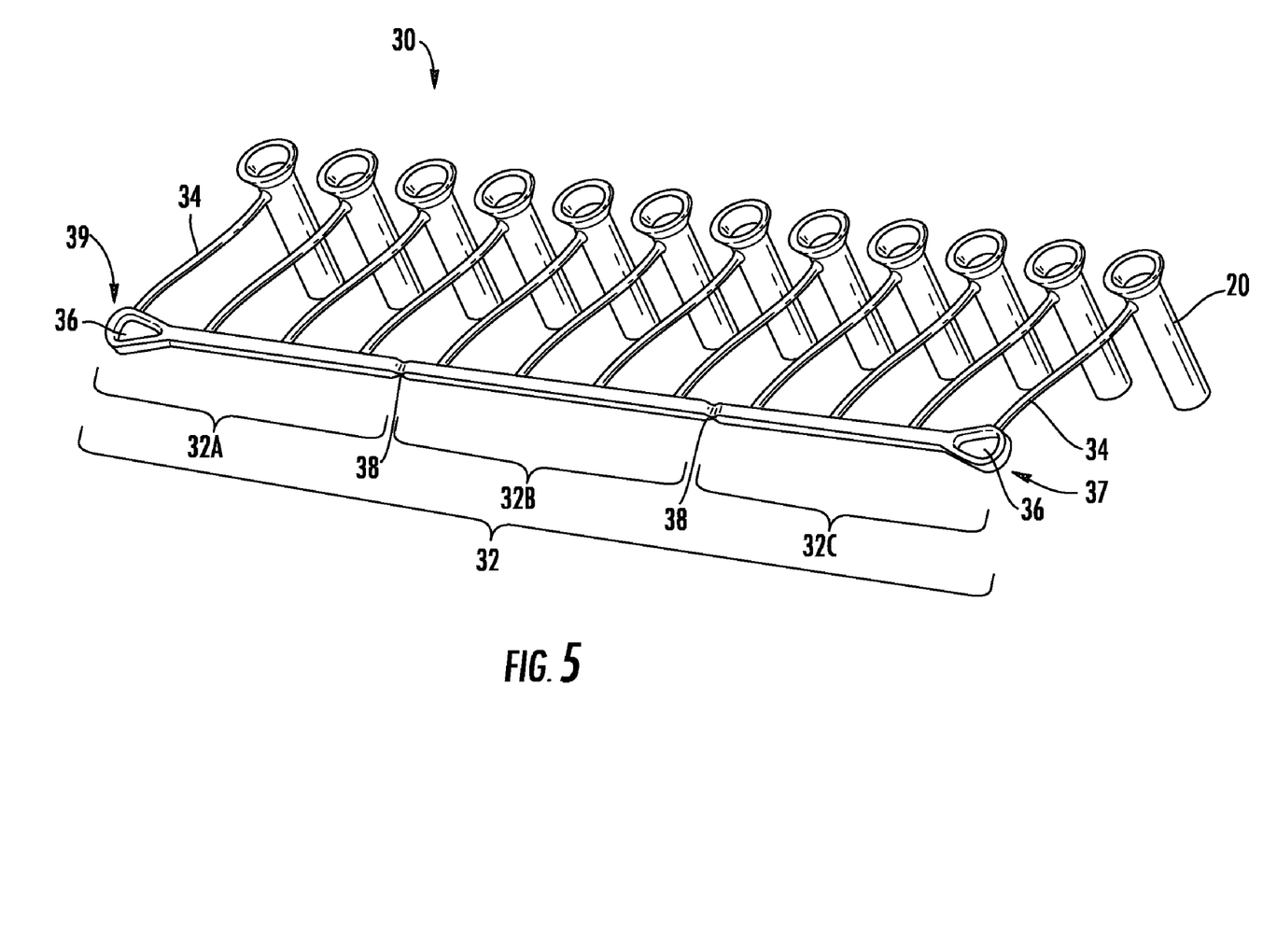
FIG. 5 illustrates a top perspective view of another alternate exemplary embodiment of a fiber optic dust cap assembly wherein the lanyard includes grips and separation points.

FIG. 5 illustrates a perspective view of a further embodiment of a fiber optic dust cap assembly 30. The fiber optic dust cap assembly 30 includes a lanyard 32 and attachment cords 34 which couple the lanyard 32 to the dust caps 20, where the lanyard 32 comprises a rod. The lanyard 32 also includes grips 36 at a first end 37 and at a second end 39 opposite the first end and separation points 38 disposed throughout the lanyard 32. In this embodiment, each of the grips 36 has a substantially circular orientation that defines an orifice for facilitating easy removal of the fiber optic dust cap assembly 30 from the fiber optic adapters 14. Thus, when a technician removes the fiber optic dust cap assembly 30 from the fiber optic adapters 14, the technician may pull on the grips 36. Furthermore, a technician may simply pull on the lanyard 32 in order to remove the fiber optic dust cap assembly 30 from the fiber optic adapters 14. It should also be noted that when the fiber optic dust cap assembly 30 is manufactured using a molding process, the lanyard 32 may be runners or sprues that are used to manufacture the fiber optic dust cap assembly 30, where the runners are used to feed material into the mold used to manufacture the attachment cords 34 and the dust caps 20.

The separation points 38 are configured such that different portions of the lanyard 32 may be separated, thereby forming three separate lanyards 32A, 32B, and 32C. While FIG. 5 only illustrates two separation points 38 disposed on the lanyard 32, it should be noted that the lanyard 32 may include any number of separation points 38 disposed between the attachment cords 34 to form any number of separate lanyards 32.

Figure 6:
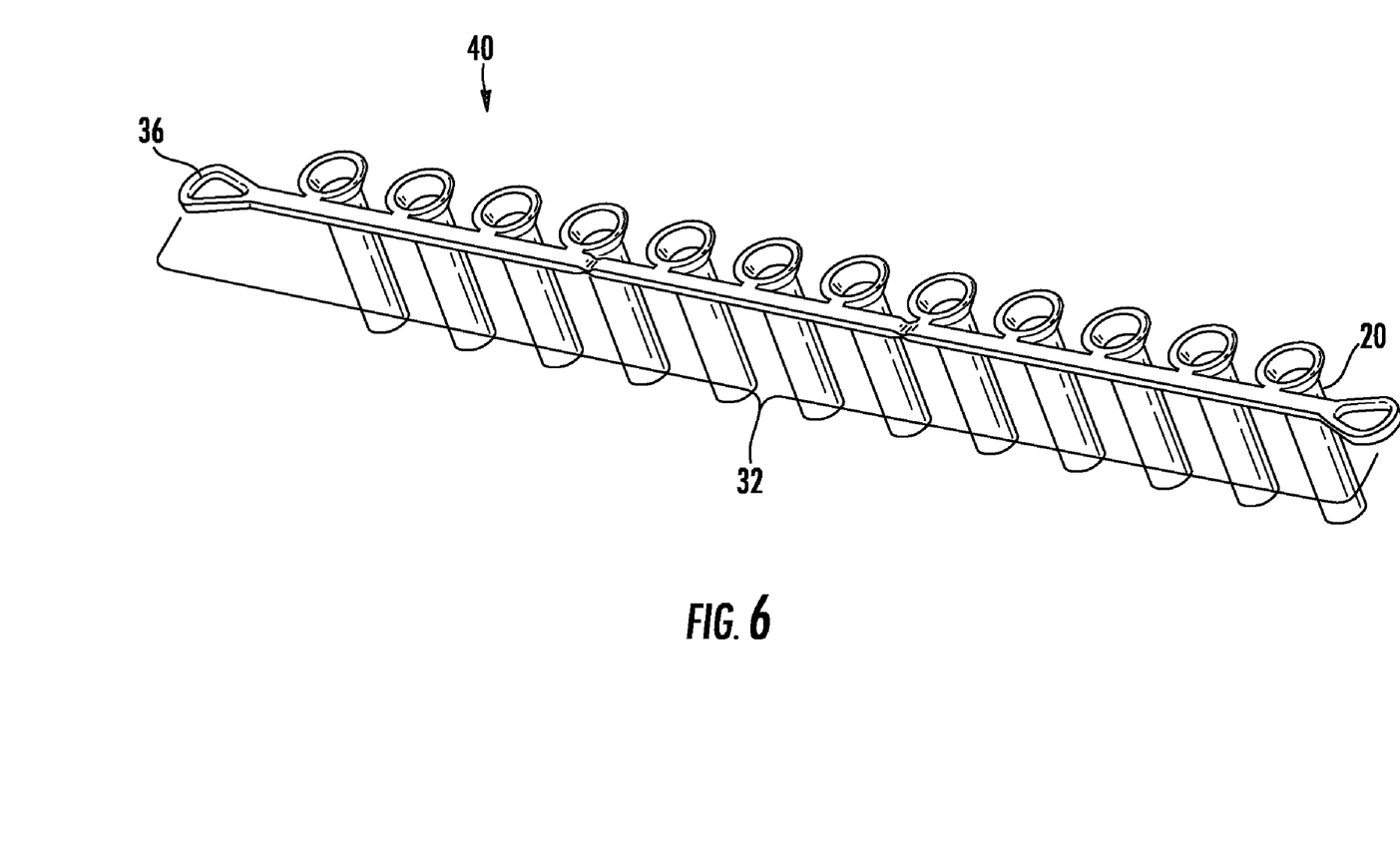
FIG. 6 illustrates a top perspective view of another alternate exemplary embodiment of a fiber optic dust cap assembly similar to the fiber optic dust cap assembly of FIG. 5, but with a lanyard directly coupled to a plurality of dust caps.

Just as provided in the fiber optic dust cap assembly 28 in FIG. 4, the fiber optic dust cap assembly 30 of FIG. 5 may be provided such that the attachment cords 34 are not provided. Such an example is provided by a fiber optic dust cap assembly 40 in FIG. 6. As illustrated in FIG. 6, the fiber optic dust cap assembly 40 includes the dust caps 20 and the lanyard 32. However, as may be seen with reference to FIG. 6, the lanyard 32 is connected directly to the dust caps 20. Thus, the fiber optic dust cap assembly 40 does not include the attachment cords 34.

In the embodiments shown in FIGS. 2-6, the fiber optic dust cap assemblies 12, 28, 30, and 40 each include a single row of dust caps 20. However, adapter modules typically have fiber optic adapters stacked in rows or in columns, as previously described and illustrated in the adapter module 11 of FIG. 1. Thus, an adapter module may have multiple rows or columns of fiber optic adapters. Furthermore, when a technician is installing optical fibers, the technician may need to install the optical fibers a couple of rows or columns at a time. To further illustrate, one row of fiber optic adapters may provide an input signal to optical fibers and a second row of fiber optic adapters immediately adjacent the input signal fiber optic adapters accepts output signals from optical fibers. If a technician is working with both rows at the same time, such as installing input signal optical fibers and output signal optical fibers, the ability to remove dust caps from adjacent rows of fiber optic adapters may be advantageous. Accordingly, a fiber optic dust cap assembly which includes at least two rows of dust caps connected with a single lanyard may be provided, as shown in FIG. 7.

Figure 7:
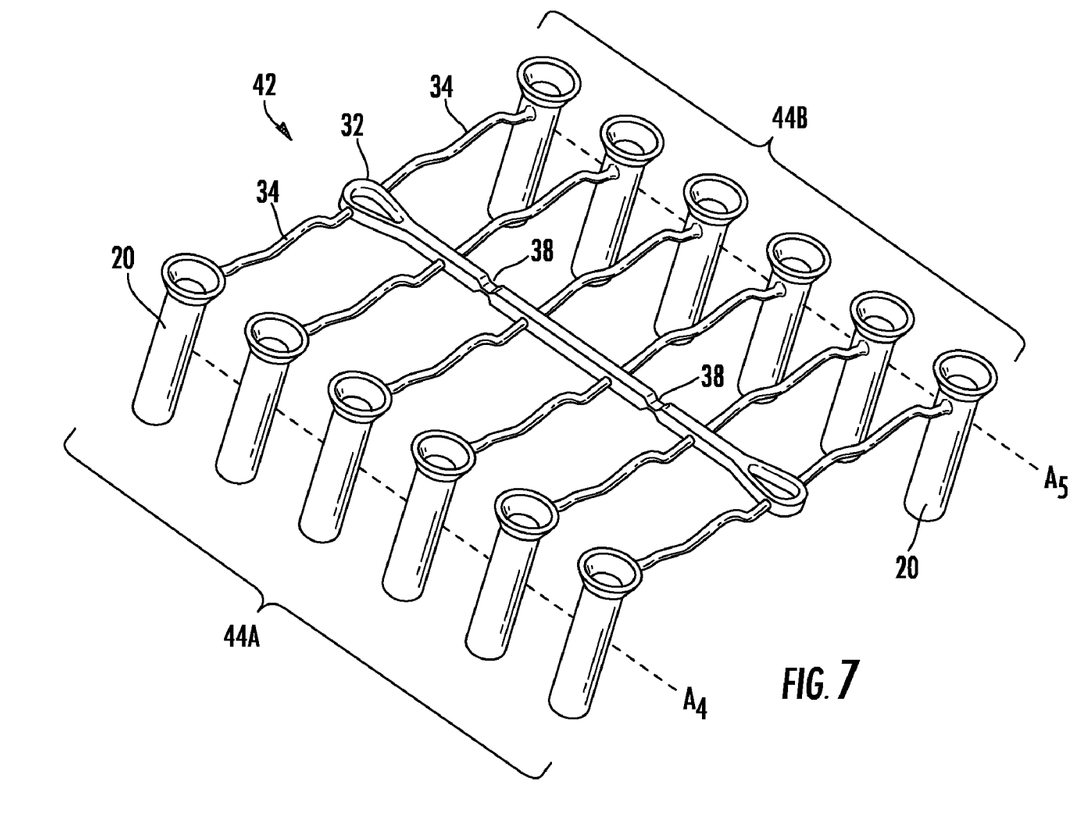
FIG. 7 illustrates a top perspective view of another alternate exemplary embodiment of a fiber optic dust cap assembly having first and second rows of dust caps.

FIG. 7 illustrates a fiber optic dust cap assembly 42 that is similar to that of FIG. 6, however two dust cap sets 44A and 44B are disposed along a first longitudinal axis $A_4$ and along a second longitudinal axis $A_5$, respectively, on each side of the lanyard 32. It should be noted that in one embodiment, the longitudinal axes $A_4$ and $A_5$ may align with the longitudinal axes $A_1$ and $A_2$ in FIG. 1. Moreover, as may be seen in FIG. 7, the dust cap set 44A is disposed opposite the dust cap set 44B. Each of the dust cap sets 44A and 44B include the dust caps 20. When the fiber optic dust cap assembly 42 is inserted into an adapter module, such as the adapter module 11 in FIG. 1, the dust caps 20 in the dust cap set 44A are inserted into a first row of fiber optic adapters of the adapter module and the dust caps 20 in the dust cap set 44B are inserted into a second row of fiber optic adapters of the adapter module adjacent to the first row of fiber optic adapters. Thus, when a technician removes the fiber optic dust cap assembly 42 from the adapter module, all the dust caps 20 in the dust cap sets 44A and 44B may be removed from fiber optic adapters 14. In addition, if a technician separates the lanyard 32 at one of the separation points 38, only two dust caps 20 from each of the dust cap sets 44A and 44B are removed from the fiber optic adapter. It should be noted that if the lanyard 32 includes additional separation points 38, then only the dust caps 20 corresponding to the lanyard section that forms upon breakage of the separation points 38 will be removed from a fiber optic adapter.

In the embodiments shown in FIGS. 1-7, the fiber optic dust cap assemblies 12, 28, 30, 40, and 42 are located along a common longitudinal axis. However, fiber optic equipment may include fiber optic components that are located along different longitudinal axes. For example, an adapter module may have a flared configuration where the adapter module is flared and the fiber optic adapters supported by the adapter module are located in different longitudinal axes. An adapter module having this configuration increases the density of fiber optic adapters, thereby increasing the number of connections that may be made.

Figure 8:
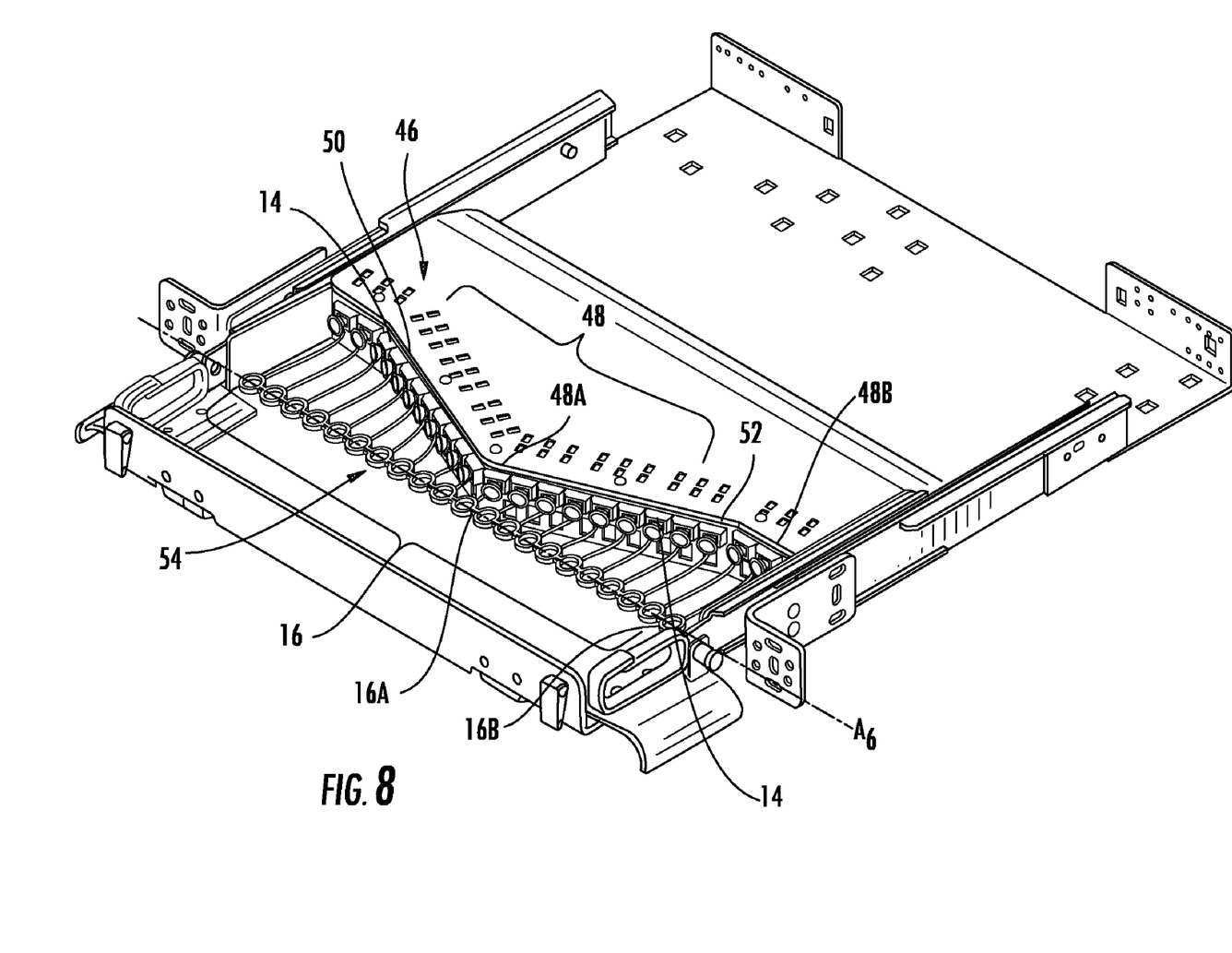
FIG. 8 illustrates a top perspective view of a fiber optic adapter equipment tray supporting a fiber optic adapter module having fiber optic adapters located in different longitudinal planes and a fiber optic dust cap assembly having attachment cords with different lengths and connected to fiber optic adapters to provide to a lanyard in one longitudinal plane.

An example of this type of adapter module is shown in FIG. 8. As illustrated therein, an alternate embodiment of a fiber optic dust cap assembly 54 is shown. In this embodiment, an adapter module 46 includes a flared portion 48. The flared portion 48 includes panels 50 and 52, where the panels 50 and 52 are disposed at angles relative to each other. The flared portion 48 along with the panels 50 and 52 increase the density of the fiber optic adapters 14 of the adapter module 46. Accordingly, the adapter module 46 may accept a greater number of fiber optic cables (not shown). The fiber optic dust cap assembly 54 is inserted into the adapter module 46. Specifically, as will be discussed with reference to FIG. 9, the fiber optic dust cap assembly 54 is configured such that dust caps 20 of the fiber optic dust cap assembly 54 may fit into fiber optic adapters 14 of the flared portion 48. Moreover, the fiber optic dust cap assembly 54 is configured such that the lanyard 16 of the fiber optic dust cap assembly 54 lies along a longitudinal axis $A_6$.

Figure 9:
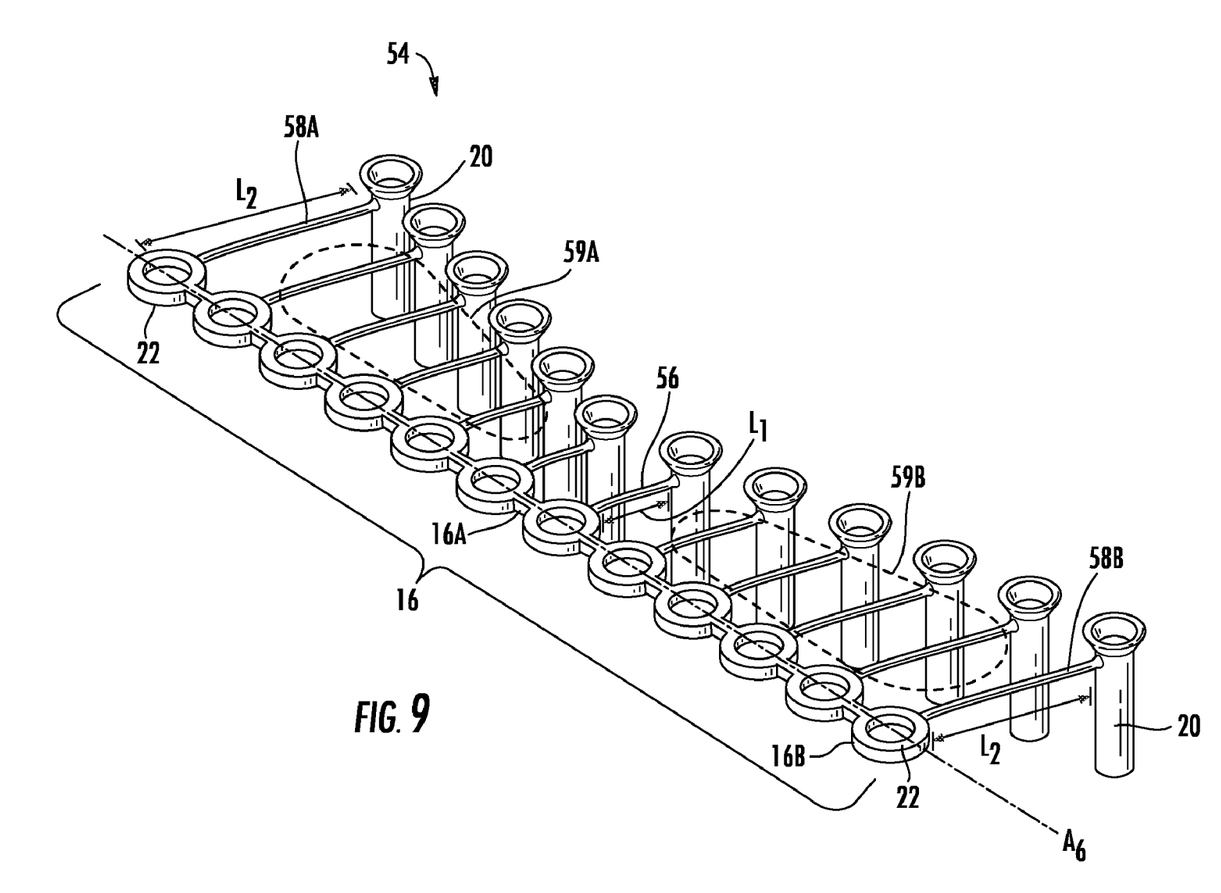
FIG. 9 illustrates the fiber optic dust cap assembly provided in FIG. 8.

Now making reference to FIG. 9, an embodiment of the fiber optic dust cap assembly 54 is shown that may be used with the adapter module 46 in FIG. 8. The fiber optic dust cap assembly 54 includes the lanyard 16, the dust caps 20, and the grips 22 like that of the fiber optic dust cap assembly 12 of FIG. 2. In addition, the fiber optic dust cap assembly 54 includes attachment cords 56 and 58A, 58B having different or staggered lengths $L_1$ and $L_2$, respectively. The lengths of intermediate attachment cords 59A, 59B located between the attachment cords 56 and 58A, 58B may be arranged where their lengths continually increase from $L_1$ to $L_2$ as illustrated in FIG. 9. Alternatively, the lengths of adjacent attachment cords in the intermediate attachment cords 59A, 59B could increase and decrease in varying or different lengths ranging from $L_1$ and $L_2$. The fiber optic dust cap assembly 54 includes a plurality of attachment cords coupled with the dust caps 20 of the fiber optic dust cap assembly 54, each having staggered lengths. However, only the attachment cords 56 and 58A, 58B will be discussed. The length $L_1$ of the attachment cord 56 is substantially shorter than the length $L_2$ of the attachment cords 58A, 58B. As will be detailed further on, the lengths of the attachment cords 56 and 58A, 58B are staggered such that when the fiber optic dust cap assembly 54 is installed in the adapter module 46, the lanyard 16 lies along the longitudinal axis $A_6$.

Returning to FIG. 8, as previously mentioned, the lanyard 16 of the fiber optic dust cap assembly 54 lies along the longitudinal axis $A_6$. The staggered lengths of the attachment cords 56 and 58A, 58B of the fiber optic dust cap assembly 54 allow for the lanyard 16 to lie along the longitudinal axis $A_6$. In particular, the flared portion 48 includes points 48A and 48B. Here, the point 48A juts out further than the point 48B. The points 48A and 48B align with points 16A and 16B, respectively, of the lanyard 16. As shown in FIG. 9, the point 16A is near the attachment cord 56, which has the length $L_1$. Furthermore, the point 16B coincides with the attachment cord 58B, which has the length $L_2$. Thus, as the attachment cord 56 having the shortest length, $L_1$, corresponds to the point 48A and the attachment cord 58A having the longest length, $L_2$, corresponds to the point 48B. The staggered lengths allow for the lanyard 16 to lie along the longitudinal axis $A_6$. As such, when a technician removes the fiber optic dust cap assembly 54 from the adapter module 46, the technician need only grab the fiber optic dust cap assembly 54 at one point. In the examples shown in FIGS. 1-9, fiber optic dust cap assemblies 12, 28, 30, 40, 42, and 54 interfacing with the fiber optic adapters 14 have been shown. However, a fiber optic dust cap assembly may also be used for MTP connectors, as will be detailed in FIGS. 10 and 11.

Figure 10:
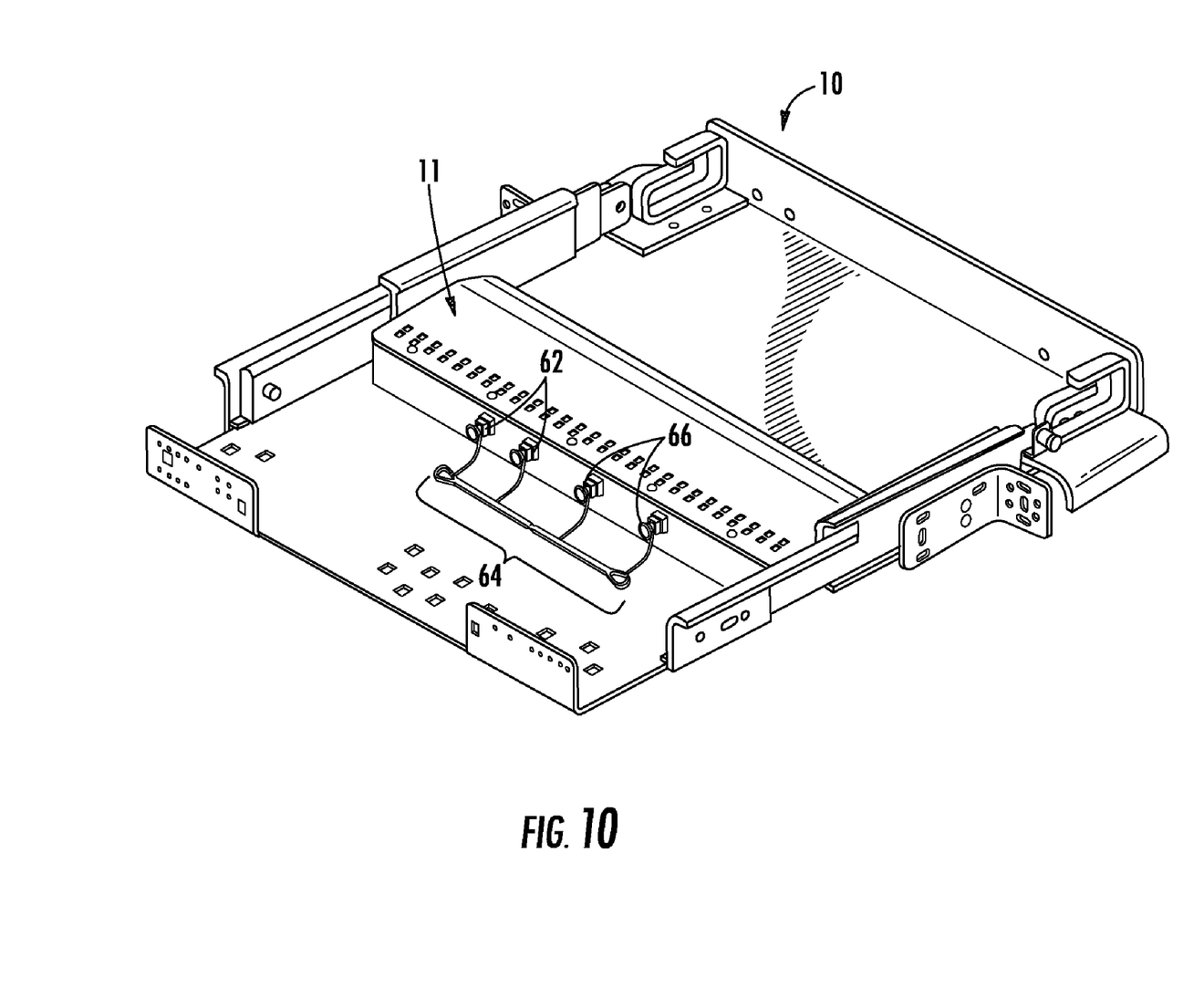
FIG. 10 illustrates a rear, top perspective view of the fiber optic equipment tray of FIG. 1 with a fiber optic dust cap assembly connected to a plurality of fiber optic adapters on a rear side of the fiber optic adapter module.

FIG. 10 shows the rear of the fiber optic equipment tray 10 and the adapter module 11 of FIG. 1. As illustrated therein, four MTP connector adapters 62 are provided. The MTP connector adapters 62 are designed for multi-mode or single-mode applications, and may use a push/pull design for easy mating and removal. Here, a fiber optic dust cap assembly 64 is used to cover the MTP connector adapters 62. Specifically, the fiber optic dust cap assembly 64 includes dust caps 66 which are configured for insertion into the MTP connector adapters 62. In this embodiment, only four dust caps 66 are shown inserted into the MTP connector adapters 62. However, it should be noted that the adapter module 11 may include any number of MTP connector adapters 62. Also, it should be noted that the fiber optic dust cap assembly 64 may include any number of the dust caps 66 corresponding with the number of the MTP connector adapters 62.

Figure 11:
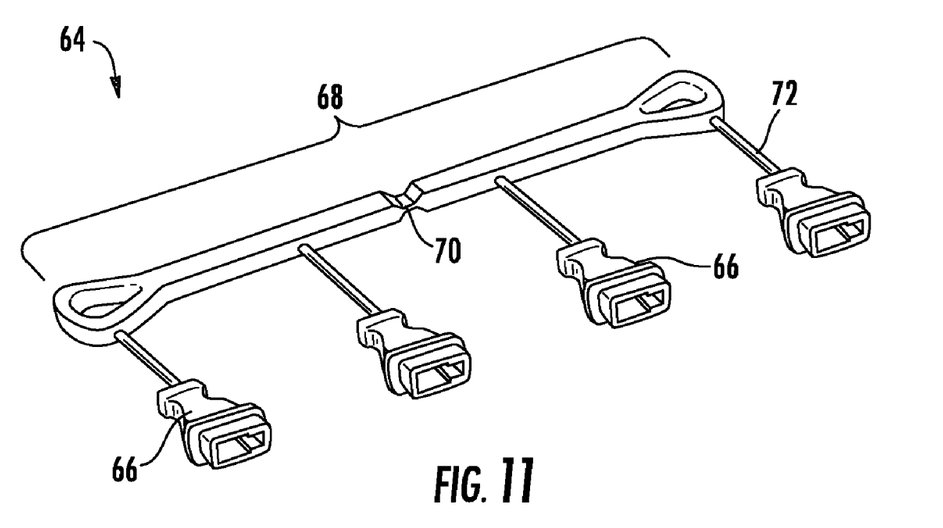
FIG. 11 illustrates the fiber optic dust cap assembly connected to fiber optic adapters on the rear side of the fiber optic adapter module in FIG. 10.

Now making reference to FIG. 11, the fiber optic dust cap assembly 64 is shown in greater detail. Here, the fiber optic dust cap assembly 64 includes a lanyard 68 having a separation point 70. The fiber optic dust cap assembly 64 also includes attachment cords 72 coupled with both the lanyard 68 and the dust caps 66. Here, the lanyard 68 is shown having a single separation point 70 having functionality similar to that described with reference to the separation points 24 in FIG. 2. However, it should be noted that the lanyard 68 may include any number of separation points 70, where the separation points 70 are disposed on the lanyard 68 at points between the attachment cords 72. In the embodiment shown in FIG. 11, the lanyard 68 is shown having a rod. However, it should be noted that the lanyard 68 may include grips, such as the grips 22 previously described in FIGS. 2-4. It should also be noted that while the fiber optic dust cap assembly 64 is shown having the attachment cords 72 coupled with both the lanyard 68 and the dust caps 66, the lanyard 68 may be directly coupled with the dust caps 66.

In the embodiments shown in FIGS. 1-11, fiber optic dust cap assemblies 12, 28, 30, 40, 42, 54, and 64 for fiber optic adapters 14 and MTP connector adapters 62 have been shown and discussed. However, fiber optic dust cap assemblies 12, 28, 30, 40, 42, 54, and 64 may be used for any type of fiber optic component. To further illustrate, a fiber optic dust cap assembly may be used with cable pairs, such as LC duplex cable pairs, as shown in FIG. 12.

Figure 12:
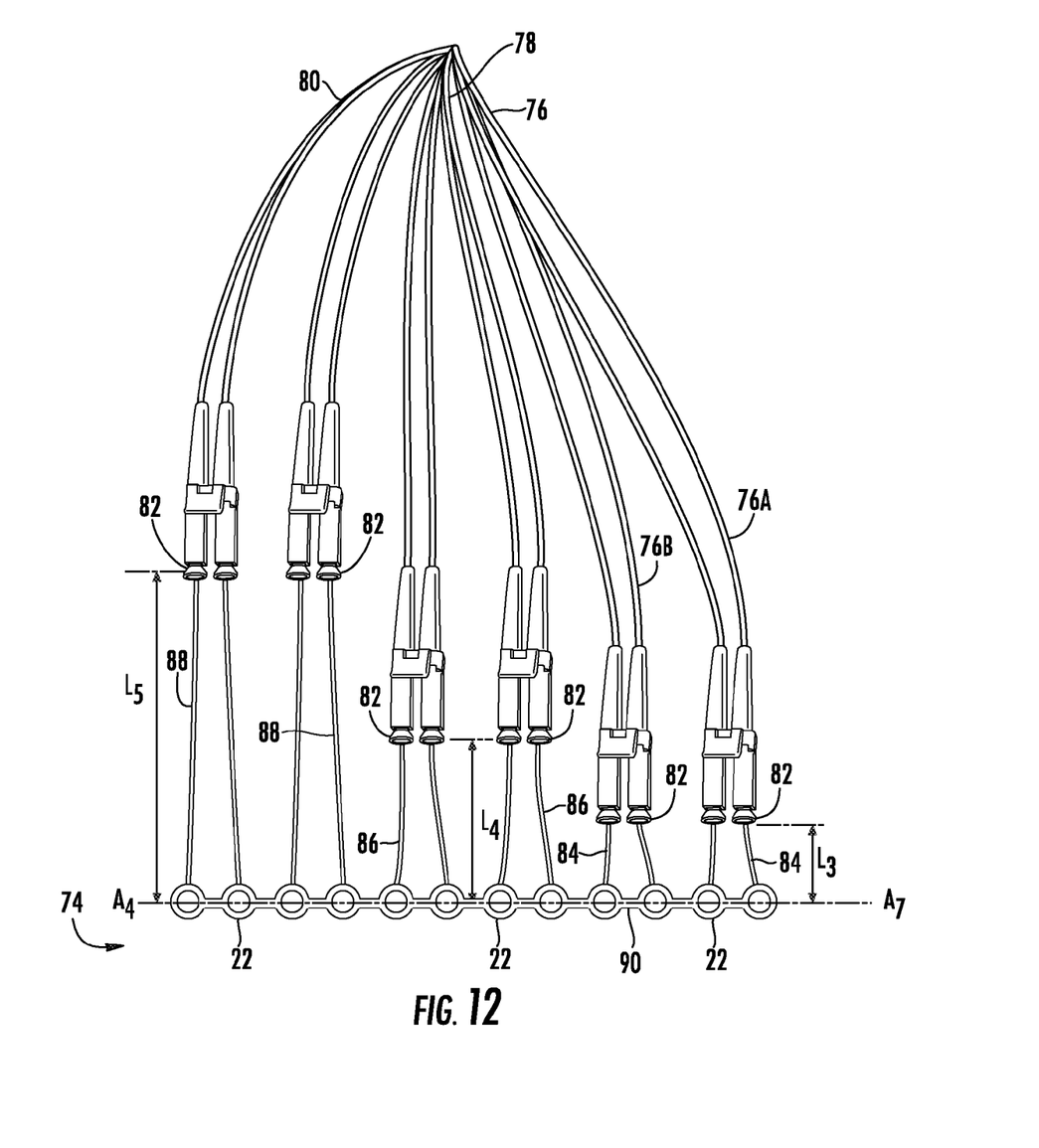
FIG. 12 illustrates another exemplary fiber optic dust cap assembly connected to a plurality of fiber optic connectors.

FIG. 12 illustrates a fiber optic dust cap assembly 74 in accordance with a further embodiment. Here, the fiber optic dust cap assembly 74 is shown covering cable pairs 76, 78, and 80. The cable pairs 76, 78, and 80 may be LC duplex cable pairs. For example, the cable pair 76 includes two separate cable pairs 76A and 76B, where the cable pair 76A includes a ferrule having an input optical fiber for receiving a fiber optic signal and a ferrule having an output optical fiber for outputting a fiber optic signal. The cable pair 76B has a similar configuration, i.e., two ferrules respectively having input and output optical fibers. It should be noted that the cable pairs 78 and 80 also include individual cable pairs having a similar configuration. In addition, although not shown, the cable pairs 76, 78, and 80 may be attached to an MTP connector such that the cable pairs 76, 78, and 80 may be coupled with an adapter module.

The fiber optic dust cap assembly 74 includes dust caps 82 coupled with attachment cords 84, 86, and 88. The fiber optic dust cap assembly 74 also includes a lanyard 90 having the grips 22 coupled with the dust caps 82 via the attachment cords 84, 86, and 88. As may be seen with reference to FIG. 12, the attachment cord 84 has a length $L_3$, the attachment cord 86 has a length $L_4$, and the attachment cord 88 has a length $L_5$. The length $L_3$ is smaller than the length $L_4$. In addition, the length $L_4$ is smaller than the length $L_5$. The lengths $L_3$, $L_4$, and $L_5$ of the attachment cords 84, 86, and 88 are dependent upon the overall length of the cable pairs 76, 78, and 80. Specifically, the cable pair 76 is longer than the cable pair 78. Accordingly, the length $L_3$ of the attachment cords 84, which facilitate connection of the dust caps 82 with the cable pair 76, is shorter than the length $L_4$ of the attachment cords 86. In addition, as the cable pair 78 is longer than the cable pair 80, the length $L_5$ of the attachment cords 88 is longer than the length $L_4$ of the attachment cords 86. The lengths $L_3$, $L_4$, and $L_5$ of the attachment cords 84, 86, and 88 vary such that a lanyard 90 is defined across a common axis $A_7$. This is advantageous in that the common axis $A_7$ of the lanyard 90 facilitates the removal of the fiber optic dust cap assembly 74 from the cable pairs 76, 78, and 80.

In this embodiment, the attachment cords 84, 86, and 88 have varying lengths in order to accommodate the varying lengths of the cable pairs 76, 78, and 80. However, it should be noted that while the cable pairs 76, 78, and 80 are shown having varying lengths, the cable pairs 76, 78, and 80 may have the same length, or two pairs of the cable pairs 76, 78, and 80 may have the same length while the third pair has a different length. Furthermore, while an LC duplex cable pair has been shown and described, the embodiments disclosed herein and the invention are not limited to this type of cable. Thus, a fiber optic dust cap assembly may be used to protect any type of cable employing optical fibers or any type of cable used in fiber optic applications. In this embodiment, the lanyard 90 is shown with the grips 22. However, the lanyard 90 may also include grips having a rod configuration, as shown in FIG. 5. It should be noted that while the dust caps 82 of the cable pairs 76, 78, and 80 have been shown as being connected to one another, in an alternate embodiment, the dust caps 82 may not be connected, as shown in FIG. 13.

Figure 13:
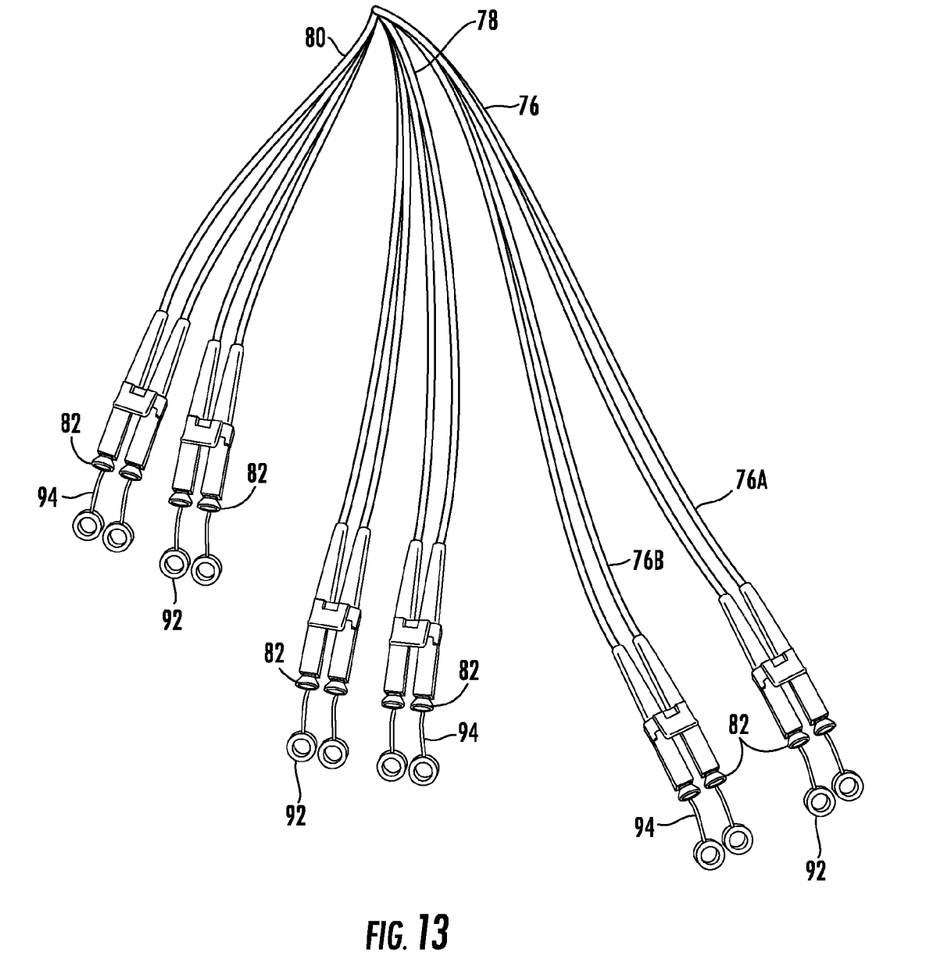
FIG. 13 illustrates a further exemplary embodiment of a fiber optic dust cap assembly connected to a plurality of fiber optic connectors.

FIG. 13 illustrates alternate dust cap assemblies which may be used for a plurality of fiber optic cables, according to one embodiment. Here, the cable pairs 76, 78, and 80 do not include the fiber optic dust cap assembly 74. Instead, each of the cable pairs 76, 78, and 80 includes the dust caps 82 coupled to grips 92 via attachment cords 94. In this embodiment, if a technician only needs to use the cable pair 78, the technician may remove the dust caps 82 inserted into the cable pair 78, while the dust caps inserted into the cable pairs 76 and 80 remain therein. Thus, the embodiment shown in FIG. 13 increases the flexibility of a dust cap assembly.

A method of installing and removing a fiber optic dust cap assembly from one or more fiber optic components, such as fiber optic adapters and connectors as examples, is also provided. This method may be performed with any of the aforementioned examples and embodiments of a fiber optic dust cap assembly. In the method, a fiber optic dust cap assembly having a plurality of dust caps coupled to a lanyard is provided. Each of the plurality of dust caps is configured for insertion into the fiber optic components. The dust caps can then be inserted into the fiber optic components to protect the fiber optic components. As an example, this insertion can occur during manufacturing, assembly, or in the field to protect the fiber optic components when not connected. After one or more dust caps from the fiber optic dust cap assembly is installed, if a technician later desires to provide an optical connection to a particular fiber optic component or components protected by a dust cap from the fiber optic dust cap assembly, the technician may pull the lanyard in order to remove one or more of the dust caps from fiber optic components. If a grip is provided on the lanyard, the technician can pull the grip to pull the lanyard to remove dust caps from fiber optic components. Further, if a separation point is provided in the lanyard, the technician can also remove a subset of dust caps by separating the lanyard into two separate lanyards at the separation point and pull one of the separated lanyards to remove the subset of dust caps from fiber optic components.

Many modifications and other embodiments of the invention set forth herein will come to mind to one skilled in the art to which the invention pertains having the benefit of the teachings presented in the foregoing descriptions and the associated drawings. These modifications include, but are not limited to, alternate shapes for a fiber optic adapter module and its adapter module panel, use of flared surfaces to change angles of direction of fiber optic adapters supported by an adapter module panel, tilting and extension mechanisms for the extendible tray supporting the fiber optic adapter module, use of fiber spool guides, alternate shapes of the plunger to lock in the straight vertical position, different materials used for the door, and redesigning the back panel to be a separate part.

Therefore, it is to be understood that the invention is not to be limited to the specific embodiments disclosed and that modifications and other embodiments are intended to be included within the scope of the appended claims. It is intended that the invention cover the modifications and variations of this invention provided they come within the scope of the appended claims and their equivalents. Although specific terms are employed herein, they are used in a generic and descriptive sense only and not for purposes of limitation.

What is claimed is:

1. A fiber optic dust cap assembly, comprising:
   a plurality of dust caps, wherein each of the plurality of dust caps is configured for insertion into a fiber optic component;
   a lanyard coupled to each of the plurality of dust caps; and
   a plurality of attachment cords each having a first cord end connected to the lanyard and a second cord end connected to a dust cap among the plurality of dust caps.

2. The fiber optic dust cap assembly of claim 1, wherein the lanyard comprises a rod.

3. The fiber optic dust cap assembly of claim 1, wherein the lanyard comprises at least one separation point for separating the lanyard into at least a first lanyard and a second lanyard.

4. The fiber optic dust cap assembly of claim 1, wherein the lanyard directly couples to each of the plurality of dust caps.

5. The fiber optic dust cap assembly of claim 1, wherein the lanyard further comprises at least one grip coupled to the lanyard.

6. The fiber optic dust cap assembly of claim 5, wherein the at least one grip comprises a first grip disposed on a first lanyard end of the lanyard and a second grip disposed on a second lanyard end of the lanyard.

7. The fiber optic dust cap assembly of claim 6, wherein the lanyard comprises at least one separation point between the first grip and the second grip for separating the lanyard into at least two separate lanyards.

8. The fiber optic dust cap assembly of claim 1, wherein the lanyard further comprises at least one separation point between a first lanyard end and a second lanyard end for separating the lanyard into at least two separate lanyards.

9. The fiber optic dust cap assembly of claim 1, wherein at least two of the plurality of attachment cords have different lengths.

10. The fiber optic dust cap assembly of claim 1, wherein the lanyard is disposed between the plurality of dust caps disposed along a first longitudinal axis and a second plurality of dust caps coupled to the lanyard disposed along a second longitudinal axis.

11. The fiber optic dust cap assembly of claim 1, wherein the plurality of dust caps is configured for insertion into either a plurality of fiber optic adapters or a plurality of fiber optic connectors.

12. The fiber optic dust cap assembly of claim 1, wherein at least one dust cap among the plurality of dust caps includes a marking.

13. An optical component, comprising:
    a plurality of fiber optic components;
    a plurality of dust caps each configured for insertion into a fiber optic component among the plurality of fiber optic components;
    a lanyard coupled with each of the plurality of dust caps; and
    a plurality of attachment cords each having a first cord end connected to the lanyard and a second cord end connected to a dust cap among the plurality of dust caps.

14. The optical component of claim 13, wherein the lanyard comprises at least one separation point for separating the lanyard into at least a first lanyard and a second lanyard.

15. The optical component of claim 13, wherein the lanyard directly couples to each of the plurality of dust caps.

16. The optical component of claim 13, wherein the lanyard further comprises at least one grip coupled to the lanyard.

17. The optical component of claim 16, wherein the at least one grip comprises a first grip disposed on a first lanyard end of the lanyard and a second grip disposed on a second lanyard end of the lanyard.

18. The optical component of claim 13, wherein the lanyard further comprises at least one separation point between a first lanyard end and a second lanyard end for separating the lanyard into at least two separate lanyards.

19. The optical component of claim 13, wherein the lanyard is disposed between the plurality of dust caps disposed along a first longitudinal axis and a second plurality of dust caps coupled to the lanyard disposed along a second longitudinal axis.

20. The optical component of claim 13, wherein the plurality of dust caps is configured for insertion into either a plurality of fiber optic adapters or a plurality of fiber optic connectors.

21. A method of removing a dust cap assembly from fiber optic components, comprising:
    providing a lanyard having a plurality of dust caps coupled to the lanyard with a plurality of attachment cords each having a first cord end connected to the lanyard and a second cord end connected to a dust cap among the plurality of dust caps, wherein each of the plurality of dust caps is configured for insertion into a fiber optic component; and
    pulling the lanyard coupled to each of the plurality of dust caps.

22. The method of claim 21, wherein pulling the lanyard further comprises pulling a grip coupled to the lanyard.

23. The method of claim 21, further comprising at least one separation point disposed within the lanyard for separating the lanyard into at least two separate lanyards.

* * * * *